United States Patent
Watanabe

(10) Patent No.: US 8,361,653 B2
(45) Date of Patent: Jan. 29, 2013

(54) NON-AQUEOUS ELECTROLYTE SECONDARY BATTERY

(75) Inventor: Yuki Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 238 days.

(21) Appl. No.: 12/869,938

(22) Filed: Aug. 27, 2010

(65) Prior Publication Data

US 2011/0052982 A1    Mar. 3, 2011

(30) Foreign Application Priority Data

Aug. 28, 2009  (JP) ................................. 2009-198564
Aug. 28, 2009  (JP) ................................. 2009-198567

(51) Int. Cl.
*H01M 6/04*    (2006.01)

(52) U.S. Cl. ....................................... 429/207; 429/206

(58) Field of Classification Search .................. 429/207, 429/206
See application file for complete search history.

(56) References Cited

FOREIGN PATENT DOCUMENTS

| JP | 01-286262 | 11/1989 |
| JP | 03-119667 | 5/1991 |
| JP | 04-355057 | 12/1992 |
| JP | 07-211349 | 8/1995 |
| JP | 2001-093571 | 4/2001 |
| JP | 2001-506052 | 5/2001 |
| JP | 2001-093571 | * 6/2001 |

OTHER PUBLICATIONS

Pozharskii "Naphthalene Proton Sponges", Russian Chemical Reviews 67 1 24 (1998), pp. 1-24.
Staab et al., 4, 5-Bis(dimethylamino) Fluorene, a New Proton Sponge, Angew. Chem. Int. Ed. Engl. 22 (1983) No. 9.
Saupe et al., 4, 5-Bis(dimethylamino)phenanthrene and 4, 5-Bis(dimethylamino)-9,10-dihydropphenanthrene: Synthesis and "Proton Sponge" Properties Angew. Chem. Int. Ed. Engl. 25 (1986) No. 5, pp. 451-453.
Staab et al., Synthesis, Structure and Basicity of 1,9-Bis(Dimethylamino)-Dibenzothiophene and 1,9-Bis(Dimethylamino)-Dibenzothiophene and 1,9-Bis(Dimethylamino)-Dibenzoselenophene 1,2), Tetrahedron Letters, vol. 29, No. 16, pp. 1905-1908, 1988.
Howard, "Relationship between Basicity, Strain, and Intermolecular Hydrogen-Bond Energy in Proton Sponges", J. Am. Chem. Soc., 2000, 122, pp. 8238-8244.

* cited by examiner

*Primary Examiner* — Edward Cain
(74) *Attorney, Agent, or Firm* — Nixon & Vanderhye P.C.

(57) ABSTRACT

A non-aqueous electrolyte battery comprising a negative electrode containing a carbon material capable of doping and dedoping lithium ions as a negative electrode active material; a positive electrode containing a composite oxide of lithium and a transition metal as a positive electrode active material; and a non-aqueous electrolytic solution; wherein the non-aqueous electrolytic solution contains 0.001% by weight or more and 5% by weight or less of a diamine compound having two tertiary amino groups capable of interacting with a proton.

13 Claims, 1 Drawing Sheet

E ; $CH_2$, -CH=CH-, O, S, Se content of 4,5-bis (dimethylamino)fluorene

NON-AQUEOUS ELECTROLYTE SECONDARY BATTERY

CROSS-REFERENCES TO RELATED APPLICATIONS

This application is related to Japanese applications Nos. 2009-198564 filed on Aug. 28, 2009 and 2009-198567 filed on Aug. 28, 2009, whose priorities are claimed under 35 USC §119, the disclosures of which are incorporated by reference in their entirety.

BACKGROUND OF THE INVENTION

1. Field of the Invention

The present invention relates to a non-aqueous electrolyte battery. More particularly, the present invention relates to a non-aqueous electrolyte battery that can be used as a lithium ion battery capable of reversely exchanging lithium ions between positive and negative electrodes.

2. Description of the Related Art

Since an electrolyte battery has excellent characteristics such as light weight, high energy density and less self-discharge, the electrolyte battery has intensively studied and developed, recently.

Particularly in the case of a lithium ion secondary battery in which a charge-discharge reaction proceeds by repeating dedoping and doping of lithium ions with which a negative electrode active material or a positive electrode active material has been chemically and physically doped in advance, large energy density is obtained compared with a lead battery and a nickel cadmium battery that are other non-aqueous electrolyte batteries. Therefore, demands for the lithium ion secondary battery as a power supply to be mounted in a portable electronic equipment such as a mobile phone have been increased. With further miniaturization and weight saving of the portable electronic equipment, further miniaturization and an increase in energy density are required to the non-aqueous electrolyte battery as a power supply.

In order to reduce carbon dioxide to be discharged from a vehicle as a dispersion type emission source of carbon dioxide that is said to be a cause of global warming, it is required to put a hybrid vehicle and an electric vehicle into practical use. A development of a lithium ion secondary battery having high weight energy density and volume energy density holds a key to this practical use. In order to establish a sustainable society, it is indispensable to increase a use rate of natural energy among energy to be supplied, and a solar battery has commonly become popular as one of supply sources of natural energy. Herein, a lithium ion secondary battery is also considered as a useful member capable of storing electricity generated by a solar battery in view of energy density and capacity. As described above, the lithium ion secondary battery exerts an influence on the development in various fields.

Commonly, the lithium ion secondary battery is comprised of a negative electrode, a positive electrode, a separator, an electrolyte or an electrolytic solution, and a battery container that accommodates them. Examples of the electrolytic solution to be used in the lithium ion secondary battery include those prepared by dissolving $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof, as electrolyte salts, in a carbonic acid ester-based non-aqueous solvent such as ethylene carbonate, propylene carbonate or diethyl carbonate.

The electrolytic solution containing $LiPF_6$ dissolved therein is widely used in view of solubility in an organic solvent and high electric conductivity, but has such a problem that it is inferior in thermostability and storage characteristics. The electrolytic solution containing $LiBF_4$ dissolved therein shows high thermostability and oxidation stability, but has such a problem that it is inferior in electric conductivity. Furthermore, the electrolytic solution containing $LiCF_3SO_3$ dissolved therein shows high thermostability, but has such a problem that it is inferior in electric conductivity and oxidation stability, and that sufficient discharge characteristics cannot be obtained when charged at a high voltage of 4 V or more. Furthermore, an electrolytic solution containing $LiN(CF_3SO_2)_2$, $LiClO_4$ or $LiAsF_6$ dissolved therein shows high electric conductivity, but has such a problem that it is inferior in cycle characteristics. Furthermore, an electrolytic solution containing $LiN(C_2F_5SO_2)_2$ or $LiN(C_4F_9SO_2)$ $(CF_3SO_2)$ dissolved therein shows high electric conductivity and also has excellent thermostability but is inferior in oxidation stability, thus causing a problem that sufficient cycle characteristics cannot be obtained when charged and discharged at a high voltage of 4 V or more.

As described above, conventional electrolytic solutions containing electrolyte salts dissolved therein could not simultaneously satisfy cycle characteristics and storage stability while maintaining excellent electric conductivity. Lithium fluoride LiF and hydrogen fluoride HF to be produced by thermolysis or hydrolysis of a lithium salt in the electrolytic solution are considered as a cause for deterioration of battery performances such as cycle characteristics and storage stability. Therefore, there has been required a technique that sufficiently suppresses an influence of hydrogen fluoride at high temperature. There has also been required a technique that sufficiently suppresses an influence of hydrogen fluoride over a long period.

In order to respond to these requirements, Japanese Unexamined Patent Publication No. 2001-93571 (Patent Document 1) describes a technique in which a 1,8-bis(dialkylamino)naphthalene derivative such as 1,8-bis (dimethylamino)naphthalene is added to the electrolytic solution so as to impart cycle characteristics and storage stability at high temperature.

Also, Japanese Unexamined Patent Publication No. HEI 7(1995)-211349 (Patent Document 2) describes a method in which an adsorbent of a metal oxide such as aluminum oxide is built in the battery and adsorption removal is conducted.

Also, Japanese Unexamined Patent Publication No. HEI 4(1992)-355057 (Patent Document 3) describes a method in which adsorption removal is conducted using activated carbon or silica gel.

Also, Japanese Unexamined Patent Publication No. HEI 3(1991)-119667 (Patent Document 4) describes a method in which a basic treating agent such as an ammonium salt is used.

Also, Japanese Unexamined Patent Publication No. HEI 1(1989)-286262 (Patent Document 5) describes a method in which an organic lithium compound such as pentafluorophenyl lithium is added to the electrolytic solution.

Also, Japanese Unexamined Patent Publication No. 2001-506052 (Patent Document 6) proposes a technique in which a decomposition reaction caused by an acid is suppressed by neutralizing an acid generated in the battery. Specifically, the document describes a technique in which a basic compound such as a metal-containing base, a carbonate, a metal oxide, a hydroxide, an amine or an organic base is added to the electrolytic solution.

SUMMARY OF THE INVENTION

According to the present invention, there is provided a non-aqueous electrolyte battery comprising a negative electrode containing a carbon material capable of doping and dedoping lithium ions as a negative electrode active material; a positive electrode containing a composite oxide of lithium and a transition metal as a positive electrode active material; and a non-aqueous electrolytic solution; wherein the non-aqueous electrolytic solution contains 0.001% by weight or more and 5% by weight or less of a diamine compound having two tertiary amino groups capable of interacting with a proton.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
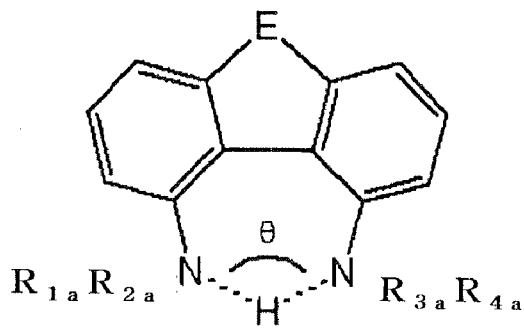
FIG. 1 is a schematic view for explaining an angle between two nitrogen atoms in amino groups and a proton.

According to a comparison test carried out by the present inventors, charge-discharge characteristics were drastically deteriorated in the case of a method of adding 1,8-bis(dimethylamino)naphthalene described in Patent Document 1.

As described in Patent Documents 2 and 3, methods using the treating agent in a form of a solid had a problem such as a change of a battery design.

As described in Patent Documents 4 and 5, methods using the organic basic treating agent and the organic lithium compound had a problem such as poor proton capturing performances and thermostability at high temperature.

In the method described in Patent Document 6, when a battery is charged and discharged, it was difficult to obtain an effect of neutralizing an acid over a long period since decomposition of a basic compound occurs during an oxidation-reduction reaction on an electrode surface and electrons are extracted from a basic compound in a positive electrode. In addition, there was also a problem that a decomposition product produced as a result of the decomposition of a basic compound drastically decreases charge and discharge efficiency.

The present inventors consider that it is one of causes of deterioration of battery characteristics in the methods of Patent Documents 1 to 6 that an adverse influence of hydrogen fluoride could not be sufficiently suppressed.

It can be said that the electrolytic solution containing $LiPF_6$, which shows comparatively high electric conductivity and is potentially stable, dissolved therein is an excellent electrolytic solution. However, this electrolytic solution had a problem that it was inferior in thermostability, cycle characteristics and storage characteristics. This reason is considered that $LiPF_6$ in the electrolytic solution is thermolyzed and that lithium fluoride (LiF) and hydrogen fluoride (HF) produced by hydrolysis exert an adverse influence on battery performances. For example, when a trace amount of moisture is inevitably mixed into an electrolytic solution that should be a non-aqueous solution, or moisture is adsorbed on other battery materials, or the non-aqueous electrolytic solution adsorbs moisture in an environment where batteries are produced, a hydrolysis reaction as shown in the reaction scheme (1) shown below occurs to generate hydrogen fluoride.

$$LiPF_6+H_2O \rightarrow 2HF+LiF+POF_3 \quad (1)$$

When pinholes having a size, which cannot be found during the production of batteries, are present in a battery container, or sealing is not sufficiently conducted during the production of batteries, moisture may gradually penetrate into a battery container during long-term storage or long-term use, thereby causing hydrolysis of $LiPH_6$. There is a problem that hydrogen fluoride thus generated causes deterioration of a material constituting the battery, resulting in deterioration of battery performances. For example, as a result of deterioration of the constituent material, internal resistance becomes inferior, and thus charge and discharge efficiency decreases. It is known that a reaction of the reaction scheme (1) is accelerated in a high temperature range.

Thus, an object of the present invention is to provide a non-aqueous electrolyte battery having a function of suppressing an adverse influence of an acid such as hydrogen fluoride generated by hydrolysis of a lithium salt over a long period in a simple and easy method.

The present inventors have studied so as to further improve performances and found that it is possible to provide a non-aqueous electrolyte battery having a function of suppressing an adverse influence of hydrogen fluoride generated by hydrolysis of a lithium salt or the like by improving cycle characteristics and storage stability at high temperature without a change of a battery design and deterioration of charge-discharge characteristics, thus leading to the present invention.

A non-aqueous electrolyte battery according to the present invention will be described specifically below.

The non-aqueous electrolyte battery of the present invention includes a negative electrode containing a carbon material capable of doping and dedoping lithium ions as a negative electrode active material, a positive electrode containing a composite oxide of lithium and a transition metal as a positive electrode active material, and a non-aqueous electrolytic solution.

(Non-Aqueous Electrolytic Solution)

The non-aqueous electrolytic solution is an electrolytic solution prepared by dissolving an electrolyte salt in a non-aqueous solvent.

It is possible to use, as the non-aqueous solvent, any conventionally known solvents. Specific examples of the non-aqueous solvent include cyclic carbonic acid esters such as propylene carbonate and ethylene carbonate; linear carbonic acid esters such as diethyl carbonate; carboxylic acid esters such as methyl propionate and methyl butyrate; and ethers such as γ-butyrolactone, sulfolane, 2-methyltetrahydrofuran and dimethoxyethane. Taking oxidation stability into consideration, carbonic acid esters are preferably used as the non-aqueous solvent. These non-aqueous solvents can be used alone, or plural kinds of them can be used in combination.

It is possible to use, as the electrolyte salt, conventionally known electrolyte salts. Specific examples of the electrolyte salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$ and $Li_2B_{12}Cl_{12}$. These electrolyte salts can be used alone, or plural kinds of them can be used in combination. It is preferred to use, as the electrolyte salt, $LiPF_6$ in view of the fact that it has high solubility in the non-aqueous solvent and high electric conductivity can be obtained.

Even when any electrolyte salt is used, a concentration of the electrolyte salt in the non-aqueous electrolytic solution is preferably within a range from 0.2 mol/l to 2.0 mol/l, or from 0.2 mol/kg to 2.0 mol/kg. When the concentration is less than 0.2 mol/l or 0.2 mol/kg, because of a small concentration of lithium ions in the electrolytic solution, it may be impossible to sufficiently exhibit battery performances when a charge-discharge reaction is conducted at a high rate in some cases. When the concentration is more than 2.0 mol/l or 2.0 mol/kg, since movement resistance of lithium ions increases with an increase in viscosity of the electrolytic solution, battery performances may drastically deteriorate in some cases. A more preferred concentration is within a range from 0.5 mol/l to 1.5 mol/l, or from 0.5 mol/kg to 1.5 mol/kg.

The non-aqueous electrolytic solution contains 0.001% by weight or more and 5% by weight or less of a diamine compound having two amino groups capable of interacting with a proton. Herein, when an acid is present in the non-aqueous electrolytic solution, a proton in the acid interacts with the amino groups, thus making it possible to capture the acid.

The diamine compound includes, for example, an aromatic compound having at least two benzene rings bonded via a bond or bonded directly, two amino groups being respectively present at a different substitutable position of the benzene rings, the substitutable position being a position where the two amino groups are closest with each other.

Examples of the aromatic compound having at least two benzene rings bonded via a bond include fluorene, biphenylene, carbazole, dibenzofuran, dibenzothiophene and dibenzoselenophene. Of these aromatic compounds, since 9H-carbazole having a hydrogen atom on nitrogen of a carbazole ring may cause elimination of the hydrogen atom bonded to the nitrogen of a carbazole ring during charge and discharge, it is preferred to use N-substituted carbazole protected with a substituent other than hydrogen on nitrogen. Examples of the aromatic compound having at least two benzene rings bonded directly include naphthalene, phenanthrene, anthracene, naphthacene and acridine. These aromatic compounds can be used alone, or plural kinds of them can be used in combination.

Specific examples of the diamine compound include a compound having a structure represented by the chemical formula (A):

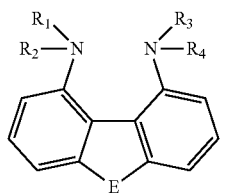

(A)

or the chemical formula (B):

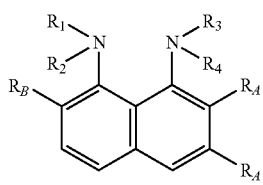

(B)

wherein E is any one of —$CH_2$—, —CH=CH—, —O—, —S— and —Se—; a substituent $R_A$ is a hydrogen atom, a methoxy group, or a residue required to form a phenyl ring together with a carbon atom to which $R_A$ is attached; $R_B$ is a hydrogen atom or a methoxy group; and substituents $R_1$ to $R_4$ are $C_nH_{2n+1}$ (n=1 to 8), and n=1 to 3 when $R_A$ in the formula (B) is a residue required to form a phenyl ring, or n=4 to 8 when $R_A$ in the formula (B) is a hydrogen atom or a methoxy group.

Furthermore, it is preferred that the diamine compound has a structure so that an angle between two nitrogen atoms in the amino groups and a proton becomes 155 degrees or more and 180 degrees or less, when interacted with the proton. When the angle is less than 155 degrees, a degree of protection of the proton with a steric hindrance of a substituent on the amino group may become insufficient and thus the diamine compound may be likely to re-desorb the proton. In a figure formed by connecting respective atoms so that two nitrogen atoms ($N_1$, $N_2$) in the amine groups and a hydrogen atom (H) are present on the same plane, when an angle of an angle $N_1HN_2$ is other than 0 degree and 180 degrees, the figure becomes a triangle. Therefore, the angle between two nitrogen atoms in the amino groups and a proton does not exceed 180 degrees.

The non-aqueous electrolytic solution contains the above diamine compound dissolved therein and therefore strongly captures the proton, thus making it possible to suppress an adverse influence of an acid. Therefore, it is possible to improve stability at high temperature without causing deterioration of charge-discharge characteristics, and therefore, particularly, the non-aqueous electrolytic solution has a function of suppressing an adverse influence of hydrogen fluoride generated by hydrolysis of an electrolyte salt (lithium salt), or the like. As a result, the non-aqueous electrolyte battery using the non-aqueous electrolytic solution containing a diamine compound strongly capture the proton and suppresses the adverse influence of an acid without changing a battery design, and therefore exhibits excellent cycle characteristics and storage stability at high temperature without causing deterioration of charge-discharge characteristics. Herein, the present inventors consider that the proton to be captured is derived from moisture existing in the non-aqueous electrolyte battery.

Since the diamine compound can strongly capture the proton and can suppress an adverse influence of the acid as long as it is a compound in which the angle between two nitrogen atoms in the amino groups and the proton is within a specific range, a structure thereof is not limited.

A more preferred diamine compound is a compound having a structure represented by the chemical formula (1):

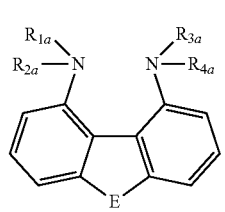

(1)

or the chemical formula (2):

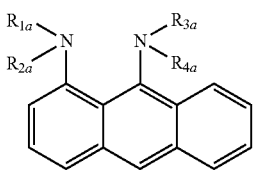

wherein E is any one of —$CH_2$—, —CH=CH—, —O—, —S— and —Se—, and substituents $R_{1a}$ to $R_{4a}$ are $C_nH_{2n+1}$ (provided that n=1 to 3).

In the above formulas (1) and (2), the substituents $R_{1a}$ to $R_{4a}$ are preferably linear alkyl groups. All the substituents $R_{1a}$ to $R_{4a}$ are particularly preferably methyl groups in view of ease of synthesis.

Specifically, a compound having a structure represented by the chemical formula (1) includes the following compounds.

4,5-bis(dialkylamino)fluorene, in which E is —$CH_2$— and all the substituents $R_{1a}$ to $R_{4a}$ are $C_nH_{2n+1}$ (provided that n=1 to 3) in the chemical formula (1), is exemplified. Particularly, 4,5-bis(dimethylamino)fluorene, in which all the substituents $R_{1a}$ to $R_{4a}$ are methyl groups in the chemical formula (1), can be preferably exemplified.

Also, 4,5-bis(dialkylamino)phenanthrene, in which E is —CH=CH— and all the substituents $R_{1a}$ to $R_{4a}$ are $C_nH_{2n+1}$ (provided that n=1 to 3) in the chemical formula (1), is exemplified. Particularly, 4,5-bis(dimethylamino)phenanthrene, in which all the substituents $R_{1a}$ to $R_{4a}$ are methyl groups in the chemical formula (1), can be preferably exemplified.

Also, 1,9-bis(dialkylamino)dibenzofuran, in which E is O and all the substituents $R_{1a}$ to $R_{4a}$ are $C_nH_{2n+1}$ (provided that n=1 to 3) in the chemical formula (1), is exemplified. Particularly, 1,9-bis(dimethylamino)dibenzofuran, in which all the substituents $R_{1a}$ to $R_{4a}$ are methyl groups in the chemical formula (1), can be preferably exemplified.

Also, 1,9-bis(dialkylamino)dibenzothiophene, in which E is S and all the substituents $R_{1a}$ to $R_{4a}$ are $C_nH_{2n+1}$ (provided that n=1 to 3) in the chemical formula (1), is exemplified. Particularly, 1,9-bis(dimethylamino)dibenzothiophene, in which all the substituents $R_{1a}$ to $R_{4a}$ are methyl groups in the chemical formula (1), can be exemplified.

Also, 1,9-bis(dialkylamino)dibenzoselenophene, in which E is Se and all the substituents $R_{1a}$ to $R_{4a}$ are $C_nH_{2n+1}$ (provided that n=1 to 3) in the chemical formula (1), is exemplified. Particularly, 1,9-bis (dimethylamino)dibenzoselenophene, in which all the substituents $R_{1a}$ to $R_{4a}$ are methyl groups in the chemical formula (1), can be preferably exemplified.

Also, 1,9-bis(dialkylamino)anthracene represented by the chemical formula (2) is exemplified. Particularly, 1,9-bis (dimethylamino)anthracene, in which all the substituents $R_{1a}$ to $R_{4a}$ are $C_nH_{2n+1}$ (provided that n=1 to 3) in the chemical formula (2), can be preferably exemplified.

The structures when a compound of the chemical formula (1) interacts with a proton are reported in Scholarly Papers 1 to 3 and the like shown below.

Scholarly Paper 1: Angew. Chem. Int. Ed. Engl. 22 (1983) 731.
Scholarly Paper 2: Angew. Chem. Int. Ed. Engl. 25 (1986) 451.
Scholarly Paper 3: Tetrahedron Lett. 29 (1988) 1905.
Scholarly Paper 4: J. Am. Chem. Soc. 122 (2000) 8238.

In these scholarly papers, compounds, in which an angle between a nitrogen atom of two amino groups in the chemical formula (1) and a proton is within a range from 168 degrees to 178 degrees, are exemplified. In the case of 1,8-bis(dimethylamino)naphthalene described in Scholarly Paper 1, the angle is 140 degrees. The angle described in the present specification is a value determined by X-ray crystallographic analysis unless otherwise specified. When it is difficult to conduct X-ray crystallographic analysis, as described in Scholarly Paper 4, the angle may be determined using molecular orbital calculation.

When these compounds interact with the proton, as described in Scholarly Paper 1 and the like, a characteristic spectrum can be observed in proton nuclear magnetic resonance (proton NMR) and an unshielded peak appears.

It is preferred that the non-aqueous electrolytic solution contains 0.001% by weight or more and 5% by weight or less of at least one kind of a diamine compound represented by the chemical formula (3):

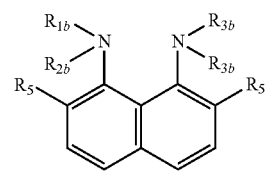

and the chemical formula (4):

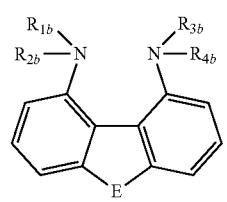

The non-aqueous electrolytic solution can strongly capture an acid by containing the above diamine compound dissolved therein. Therefore, the non-aqueous electrolytic solution has a function of suppressing an adverse influence of hydrogen fluoride generated by hydrolysis of an electrolyte salt (lithium salt), or the like. Since a basic moiety reacting with an acid is coated with a substituent, it becomes possible to suppress a decomposition reaction of a basic substance on an electrode surface, and thus an adverse influence of an acid can be suppressed over a long period.

Particularly, since the chemical formula (3) or (4) has two basic moieties in the same molecule, it is possible to realize a high acid capturing ability.

Examples of substituents $R_{1b}$ to $R_{4b}$ with which the basic moiety is coated include a linear alkyl group having 4 to 8 carbon atoms (n=4 to 8) and a branched alkyl group having 3 to 8 carbon atoms. Specific examples thereof include an isopropyl group, a n-butyl group, an isobutyl group, a sec-butyl group, a tert-butyl group, a n-pentyl group, an isopentyl group, a tert-pentyl group, a neopentyl group, a n-hexyl group, an isohexyl group, a n-heptyl group, an isoheptyl group, a n-octyl group and an isooctyl group. In the following description, "n-" is omitted.

A substituent $R_5$ is the same or different, and is a hydrogen atom and a methoxy group (OMe).

A divalent group E is any one of —$CH_2$—, —CH=CH—, —O—, —S— and —Se—.

Specific examples of the compound having a structure represented by the chemical formula (3) include 1,8-bis(dibutylamino)naphthalene in which all the substituents $R_{1b}$ to $R_{4b}$ are $C_4H_9$, and $R_5$ is H;
1,8-bis(dipentylamino)naphthalene in which all the substituents $R_{1b}$ to $R_{4b}$ are $C_5H_{11}$, and $R_5$ is H;
1,8-bis(dihexylamino)naphthalene in which all the substituents $R_{1b}$ to $R_{4b}$ are $C_6H_{13}$, and $R_5$ is H;
1,8-bis(diheptylamino)naphthalene in which all the substituents $R_{1b}$ to $R_{4b}$ are $C_7H_{15}$, and $R_5$ is H;
1,8-bis(dioctylamino)naphthalene in which all the substituents $R_{1b}$ to $R_{4b}$ are $C_8H_{17}$, and $R_5$ is H;
1,8-bis(diisopropylamino)naphthalene in which all the substituents $R_{1b}$ to $R_{4b}$ are isopropyl groups, and $R_5$ is H;
1,8-bis(ditertiary butylamino)naphthalene in which all the substituents $R_{1b}$ to $R_{4b}$ are tertiary butyl groups, and $R_5$ is H;
1,8-bis(dibutylamino)-2,7-dimethoxynaphthalene in which all the substituents $R_{1b}$ to $R_{4b}$ are $C_4H_9$, and $R_5$ is OMe;
1,8-bis(dipentylamino)-2,7-dimethoxynaphthalene in which all the substituents $R_{1b}$ to $R_{4b}$ are $C_5H_{11}$, and $R_5$ is OMe;
1,8-bis(dihexylamino)-2,7-dimethoxynaphthalene in which all the substituents $R_{1b}$ to $R_{4b}$ are $C_6H_{13}$, and $R_5$ is OMe;
1,8-bis(diheptylamino)-2,7-dimethoxynaphthalene in which all the substituents $R_{1b}$ to $R_{4b}$ are $C_7H_{15}$, and $R_5$ is OMe;
1,8-bis(dioctylamino)-2,7-dimethoxynaphthalene in which all the substituents $R_{1b}$ to $R_{4b}$ are $C_8H_{17}$, and $R_5$ is OMe;
1,8-bis(diisopropylamino)-2,7-dimethoxynaphthalene in which all the substituents $R_{1b}$ to $R_{4b}$ are isopropyl groups, and $R_5$ is OMe; and
1,8-bis(ditertiary butylamino)-2,7-dimethoxynaphthalene in which all the substituents $R_{1b}$ to $R_{4b}$ are tertiary butyl groups, and $R_5$ is OMe.

Examples of the compound further include 4,5-bis(dibutylamino)fluorene in which E is —$CH_2$—, and all the substituents $R_{1b}$ to $R_{4b}$ are $C_4H_9$ in the chemical formula (4);
4,5-bis(dipentylamino)fluorene in which all the substituents $R_{1b}$ to $R_{4b}$ are $C_5H_{11}$;
4,5-bis(dihexylamino)fluorene in which all the substituents $R_{1b}$ to $R_{4b}$ are $C_6H_{13}$;
4,5-bis(diheptylamino)fluorene in which all the substituents $R_{1b}$ to $R_{4b}$ are $C_7H_{15}$;
4,5-bis(dioctylamino)fluorene in which all the substituents $R_{1b}$ to $R_{4b}$ are $C_8H_{17}$;
4,5-bis(diisopropylamino)fluorene in which all the substituents $R_{1b}$ to $R_{4b}$ are isopropyl groups; and
4,5-bis(ditertiary butylamino)fluorene in which all the substituents $R_{1b}$ to $R_{4b}$ are tertiary butyl groups.

Examples of the compound further include 4,5-bis(dibutylamino)phenanthrene in which E is —CH=CH—, and all the substituents $R_{1b}$ to $R_{4b}$ are $C_4H_9$ in the chemical formula (4);
4,5-bis(dipentylamino)phenanthrene in which all the substituents $R_{1b}$ to $R_{4b}$ are $C_5H_{11}$;
4,5-bis(dihexylamino)phenanthrene in which all the substituents $R_{1b}$ to $R_{4b}$ are $C_6H_{13}$;
4,5-bis(diheptylamino)phenanthrene in which all the substituents $R_{1b}$ to $R_{4b}$ are $C_7H_{15}$;
4,5-bis(dioctylamino)phenanthrene in which all the substituents $R_{1b}$ to $R_{4b}$ are $C_8H_{17}$;
4,5-bis(diisopropylamino)phenanthrene in which all the substituents $R_{1b}$ to $R_{4b}$ are isopropyl groups; and
4,5-bis(ditertiary butylamino)phenanthrene in which all the substituents $R_{1b}$ to $R_{4b}$ are tertiary butyl groups.

Examples of the compound further include 1,9-bis(dibutylamino)dibenzofuran in which E is —O—, and all the substituents $R_{1b}$ to $R_{4b}$ are $C_4H_9$ in the chemical formula (4);
1,9-bis(dipentylamino)dibenzofuran in which all the substituents $R_{1b}$ to $R_{4b}$ are $C_5H_{11}$;
1,9-bis(dihexylamino)dibenzofuran in which all the substituents $R_{1b}$ to $R_{4b}$ are $C_6H_{13}$;
1,9-bis(diheptylamino)dibenzofuran in which all the substituents $R_{1b}$ to $R_{4b}$ are $C_7H_{15}$;
1,9-bis(dioctylamino)dibenzofuran in which all the substituents $R_{1b}$ to $R_{4b}$ are $C_8H_{17}$;
1,9-bis(diisopropylamino)dibenzofuran in which all the substituents $R_{1b}$ to $R_{4b}$ are isopropyl groups; and
1,9-bis(ditertiary butylamino)dibenzofuran in which all the substituents $R_{1b}$ to $R_{4b}$ are tertiary butyl groups.

Examples of the compound further include 1,9-bis(dibutylamino)dibenzothiophene in which E is —S—, and all the substituents $R_{1b}$ to $R_{4b}$ are $C_4H_9$ in the chemical formula (4);
1,9-bis(dipentylamino)dibenzothiophene in which all the substituents $R_{1b}$ to $R_{4b}$ are $C_5H_{11}$;
1,9-bis(dihexylamino)dibenzothiophene in which all the substituents $R_{1b}$ to $R_{4b}$ are $C_6H_{13}$;
1,9-bis(diheptylamino)dibenzothiophene in which all the substituents $R_{1b}$ to $R_{4b}$ are $C_7H_{15}$;
1,9-bis(dioctylamino)dibenzothiophene in which all the substituents $R_{1b}$ to $R_{4b}$ are $C_8H_{17}$;
1,9-bis(diisopropylamino)dibenzothiophene in which all the substituents $R_{1b}$ to $R_{4b}$ are isopropyl groups; and
1,9-bis(ditertiary butylamino)dibenzothiophene in which all the substituents $R_{1b}$ to $R_{4b}$ are tertiary butyl groups.

Examples of the compound further include 1,9-bis(dibutylamino)dibenzoselenophene in which E is —Se—, and all the substituents $R_{1b}$ to $R_{4b}$ are $C_4H_9$ in the chemical formula (4);
1,9-bis(dipentylamino)dibenzoselenophene in which all the substituents $R_{1b}$ to $R_{4b}$ are $C_5H_{11}$;
1,9-bis(dihexylamino)dibenzoselenophene in which all the substituents $R_{1b}$ to $R_{4b}$ are $C_6H_{13}$;
1,9-bis(diheptylamino)dibenzoselenophene in which all the substituents $R_{1b}$ to $R_{4b}$ are $C_7H_{15}$;
1,9-bis(dioctylamino)dibenzoselenophene in which all the substituents $R_{1b}$ to $R_{4b}$ are $C_8H_{17}$;
1,9-bis(diisopropylamino)dibenzoselenophene in which all the substituents $R_{1b}$ to $R_{4b}$ are isopropyl groups; and
1,9-bis(ditertiary butylamino)dibenzoselenophene in which all the substituents $R_{1b}$ to $R_{4b}$ are tertiary butyl groups.

These compounds may be used alone, or two or more kinds of them may be contained. For example, since an acid capturing ability varies depending on the compound, when a compound having a high capture rate and a compound strongly capturing over a long period are contained, it becomes possible to suppress an adverse influence of an acid over a long period. Examples of a combination capable of suppressing the adverse influence of an acid include a combination (a) of 1,8-bis(dibutylamino)naphthalene in which all the substituents $R_{1b}$ to $R_{4b}$ are $C_4H_9$, and $R_5$ is H in the chemical formula (3) and 1,8-bis(dibutylamino)-2,7-dimethoxynaphthalene in which all the substituents $R_{1b}$ to $R_{4b}$ are $C_4H_9$, and $R_5$ is OMe in the chemical formula (3); and a combination (b) of 1,8-bis(dibutylamino)naphthalene in which all the substituents $R_{1b}$ to $R_{4b}$ are $C_4H_9$, and $R_5$ is H in the chemical formula (3) and 1,8-bis(ditertiary butylamino)naphthalene in which all the substituents $R_{1b}$ to $R_{4b}$ are tertiary butyl groups, and $R_5$ is H in the chemical formula (3).

It is possible to confirm the structure by using results of X-ray crystallographic analysis of conventionally known documents and molecular orbital calculation whether or not basic moieties of these compounds are coated with a substituent.

It is preferred that 0.001% by weight or more and 5% by weight or less of the above diamine compound is dissolved in the non-aqueous electrolytic solution. When a content of the diamine compound is within the above range, it is possible to impart stability at high temperature to the non-aqueous electrolytic solution. When the content is less than 0.001% by weight, a sufficient effect of imparting stability at high temperature may not be exerted on the non-aqueous electrolytic solution. On the other hand, when the content is more than 5% by weight, charge-discharge characteristics may deteriorate in some cases. A more preferred content is within a range of 0.001% by weight or more and 2% by weight or less.

The non-aqueous electrolytic solution may also be used as a gel electrolyte after impregnating a polymer matrix with the solution. It is possible to use, in addition to an electrolyte salt, inorganic and organic solid electrolytes.

A diamine compound can be obtained by a known method. The method includes, for example, a method of obtaining the diamine compound by alkylating a corresponding diamino compound. Specifically, a diamino compound is ionized by brining into contact with sodium hydride or potassium hydride in dimethyl sulfoxide or tetrahydrofuran. Then, the ionized diamino compound is brought into contact with excess alkyl halide to obtain a diamine compound.

(Negative Electrode)

The negative electrode is not particularly limited as long as it contains a carbon material capable of doping and dedoping lithium ions as a negative electrode active material. For example, the negative electrode can be formed by mixing a negative electrode active material with a conductive material and a binder, optionally adding a proper solvent to give a pasty negative electrode mixture, coating the mixture on a surface of a current collector made of a metal foil such as a copper foil, followed by drying and increase of an active material density through pressing.

The negative electrode active material has a property of absorbing lithium ions during charge and desorbing lithium ions during discharge. Specific examples of the negative electrode active material include a metallic lithium, a carbon material such as graphite or amorphous carbon; and a polymer such as polyacetylene or polypyrrole. Of these materials, the carbon material is preferably used. Since the carbon material can increase a specific surface area and achieves a high rate of absorbing or desorbing lithium ions, charge-discharge characteristics at a large current as well as output density and regeneration density become satisfactory. In particular, use of natural graphite and artificial graphite each having high crystallinity enables an improvement in delivery efficiency of lithium ions of the negative electrode.

Examples of the conductive material include known conductive materials such as carbon black, acetylene black and graphite. Examples of the binder include known binders such as fluorine-containing resins including polytetrafluoroethylene, polyvinylidene fluoride and fluororubber; and thermoplastic resins including polypropylene and polyethylene. It is possible to use known additives in the negative electrode mixture. The conductive material, binder and additive are not essential components.

(Positive Electrode)

The positive electrode is not particularly limited as long as it contains a composite oxide of lithium and a transition metal as a positive electrode active material. For example, the positive electrode can be formed by mixing a positive electrode active material with a conductive material and a binder, optionally adding a proper solvent to give a pasty positive electrode mixture, coating the mixture on a surface of a current collector made of a metal foil such as an aluminum foil, followed by drying and increase of an active material density through pressing.

It is possible to use, as the positive electrode active material, a lithium composite oxide mainly including $Li_xMO_2$ (wherein M represents one or more kinds of transition metals, and x varies depending on a charge or discharge state of a battery and usually satisfies: $0.05 \leq x \leq 1.10$) or $LiFePO_4$. It is preferred to use, as the transition metal M constituting this lithium composite oxide, Co, Ni, Mn or the like. Specific examples of the lithium composite oxide include $LiCoO_2$, $LiNiO_2$, $Li_xNi_yCo_{1-y}O_2$ (wherein x and y vary depending on a charge or discharge state of a battery and each usually satisfies: $0<x<1$, $0.7<y<1.02$), $LiMn_2O_4$, metal-substituted lithium manganates of Al and Cr, and lithium iron phosphates. These lithium composite oxides have low electric resistance and are excellent in diffusion performance of lithium ions, and also can generate a high voltage and attain high charge and discharge efficiency and satisfactory charge and discharge cycle characteristics. Therefore, the lithium composite oxides are materials suited for used as the positive electrode active material. When used as the positive electrode active material, plural kinds of these lithium composite oxides can be used in combination.

It is possible to use, as the conductive material and the binder, known conductive materials and binders similar to the negative electrode. It is also possible to use conventionally known additives in the negative electrode mixture.

(Separator)

If necessary, a separator may be used. The separator is disposed between the negative electrode and the positive electrode, and prevents a short circuit due to a physical contact between the negative electrode and the positive electrode. It is possible to use, as the separator, a nonwoven fabric and a polyolefin microporous film made of polyethylene, polypropylene or the like.

(Assembling of Non-Aqueous Electrolyte Battery)

A known method can be employed in assembling of the non-aqueous electrolyte battery. For example, a laminate type non-aqueous electrolyte battery can be produced by the following procedure. First, the negative electrode and the positive electrode are cut into a predetermined size, and then the separator is disposed between the negative electrode and the positive electrode. A method of disposing the separator includes a method of wrapping the positive electrode using the separator. This operation is repeated thereby laminating a desired number of layers, followed by fixation so that the negative electrode and the positive electrode of a laminate do not shift. It is possible to produce a wound-layered body by winding a negative electrode sheet, a separator and a positive electrode sheet, except for a laminate.

Next, in order to collect a current of the negative electrode of the laminate or wound-layered body, for example, one end of a tab made of nickel is contact-bonded or joined to a negative electrode current collector of the negative electrode. In order to collect a current of the positive electrode of the laminate or wound-layered body, for example, one end of a tab made of aluminum and nickel is contact-bonded or joined to a positive electrode current collector of the positive electrode. In a state where another end of the tab formed on the laminate or wound-layered body protrudes out of a laminate film, the laminate or wound-layered body is accommodated in the laminate film, followed by sealing a portion except for an electrolytic solution injecting hole. Such a structure enables electrical conduction between a current collector tab and an external electrode. A predetermined amount of a non-aqueous electrolytic solution is injected into the laminate battery container thus obtained and then the electrolytic solution injecting hole is finally sealed, and thus the non-aqueous electrolyte battery can be produced.

While the description was made by way of a laminate type non-aqueous electrolyte battery, it is also possible to apply the present invention to any non-aqueous electrolyte batteries such as cylindrical, rectangular, coin-shaped and card-shaped non-aqueous electrolyte batteries.

It is also possible to apply the present invention to a primary battery and a secondary battery.

EXAMPLES

The present invention will be described in more detail below by way of examples, but the present invention is not limited to the following examples. As a reagent used in the examples, a lithium battery grade reagent manufactured by Kishida Chemical Co., Ltd. was used unless otherwise specified.

Specific examples to which the present invention is applied will be described below. Compounds represented by the chemical formulas (1) and (2) used in the present examples were synthesized and identified with reference to synthesis methods and identification methods described in known documents such as Scholarly Papers 1 to 3 unless otherwise specified. Compounds represented by the chemical formulas (3) and (4) used in the present examples were synthesized and identified with reference to synthesis methods and identification methods described in known documents (for example, Russian Chemical Reviews 67(1) 1 (1998)) unless otherwise specified.

Example 1a

In a mixed solvent of 50% by volume of ethylene carbonate and 50% by volume of diethyl carbonate, $LiPF_6$ as an electrolyte salt was dissolved so as to adjust a concentration to 1.0 mol/l. Furthermore, 4,5-bis(dimethylamino)fluorene in which E is —$CH_2$— and all the substituents $R_{1a}$ to $R_{4a}$ are methyl groups in the chemical formula (1) was dissolved in the above mixed solvent so as to adjust a concentration to 0.01% by weight to obtain a non-aqueous electrolytic solution.

Before injection of the non-aqueous electrolytic solution, a battery container has the following structure.

A positive electrode mixture was prepared by mixing 90 parts by weight of $LiFePO_4$ as an active material, 5 parts by weight of acetylene black as a conductive material and 5 parts by weight of polyvinylidene fluoride as a binder, and appropriately adding N-methyl-2-pyrrolidone, followed by dispersion. This positive electrode mixture was uniformly coated on a 20 µm thick aluminum current collector and dried, followed by compression using a roll press and further cutting into a desired size to produce a positive electrode plate.

A negative electrode mixture was prepared by mixing 90 parts by weight of natural graphite product in China and 10 parts by weight of polyvinylidene fluoride, appropriately adding N-methyl-2-pyrrolidone, followed by dispersion. This negative electrode mixture was uniformly coated on a 16 µm thick copper current collector and dried, followed by compression using a roll press and further cutting into a desired size to produce a negative electrode plate.

A 25 micron thick microporous polyethylene film was used as a separator.

The positive electrode plate was wrapped using the separator, and then alternatively laminated together with the negative electrode plate. A lead tab including aluminum and nickel was welded to the aluminum current collector of the positive electrode, while a lead tab including nickel was welded to the copper current collector of the negative electrode to produce a laminate including the positive electrode, the negative electrode and the separator.

After disposing so that the lead tab of the laminate protrudes out of a laminate film, an outer peripheral portion other than an electrolytic solution injecting hole of the laminate film was thermally fused so that the laminate is wrapped by the laminate film. Next, the non-aqueous electrolytic solution was injected into the battery container and the electrolytic solution injecting hole was sealed to produce a non-aqueous electrolyte battery.

Example 2a

A non-aqueous electrolyte battery was produced in the same manner as in Example 1a, except that 4,5-bis(dimethylamino)phenanthrene in which E is —CH=CH— and all the substituents $R_{1a}$ to $R_{4a}$ are methyl groups in the chemical formula (1) was used in place of 4,5-bis(dimethylamino)fluorene in the non-aqueous electrolytic solution.

Example 3a

A non-aqueous electrolyte battery was produced in the same manner as in Example 1a, except that 1,9-bis(dimethylamino)dibenzothiophene in which E is —S— and all the substituents $R_{1a}$ to $R_{4a}$ are methyl groups in the chemical formula (1) was used in place of 4,5-bis(dimethylamino)fluorene in the non-aqueous electrolytic solution.

Example 4a

A non-aqueous electrolyte battery was produced in the same manner as in Example 1a, except that 1,9-bis(dimethylamino)dibenzoselenophene in which E is —Se— and all the substituents $R_{1a}$ to $R_{4a}$ are methyl groups in the chemical formula (1) was used in place of 4,5-bis(dimethylamino)fluorene in the non-aqueous electrolytic solution.

Example 5a

A non-aqueous electrolyte battery was produced in the same manner as in Example 1a, except that 1,9-bis(dimethylamino)anthracene in which all the substituents $R_{1a}$ to $R_{4a}$ are methyl groups in the chemical formula (2) was used in place of 4,5-bis(dimethylamino)fluorene in the non-aqueous electrolytic solution.

Example 6a

A non-aqueous electrolyte battery was produced in the same manner as in Example 1a, except that a content ratio of 4,5-bis(dimethylamino)fluorene in the non-aqueous electrolytic solution was adjusted to 0.001% by weight.

Example 7a

A non-aqueous electrolyte battery was produced in the same manner as in Example 1a, except that the content ratio of 4,5-bis (dimethylamino)fluorene in the non-aqueous electrolytic solution was adjusted to 0.1% by weight.

Example 8a

A non-aqueous electrolyte battery was produced in the same manner as in Example 1a, except that the content ratio of 4,5-bis (dimethylamino)fluorene in the non-aqueous electrolytic solution was adjusted to 1% by weight.

Example 9a

A non-aqueous electrolyte battery was produced in the same manner as in Example 1a, except that the content ratio of 4,5-bis (dimethylamino)fluorene in the non-aqueous electrolytic solution was adjusted to 2% by weight.

Comparative Example 1a

A non-aqueous electrolyte battery was produced in the same manner as in Example 1a, except that 4,5-bis(dimethylamino)fluorene was not dissolved in the non-aqueous electrolytic solution.

Comparative Example 2a

A non-aqueous electrolyte battery was produced in the same manner as in Example 1a, except that 1,8-bis(dimethylamino)naphthalene manufactured by Merck & Co., Inc. was used after purification in place of 4,5-bis(dimethylamino) fluorene in the non-aqueous electrolytic solution.

Comparative Example 3a

A non-aqueous electrolyte battery was produced in the same manner as in Example 1a, except that the content ratio of 4,5-bis (dimethylamino)fluorene in the non-aqueous electrolytic solution was adjusted to 0.0001% by weight.

Comparative Example 4a

A non-aqueous electrolyte battery was produced in the same manner as in Example 1a, except that the content ratio of 4,5-bis (dimethylamino)fluorene in the non-aqueous electrolytic solution was adjusted to 6% by weight.

Evaluation of Characteristics

With respect to Examples 1a to 9a and Comparative Examples 1a to 4a produced as described above, storage characteristics at 60° C. and cycle characteristics at 60° C. were evaluated by the following procedures.

(1) Storage Characteristics at 60° C.

Each battery was subjected to a constant current/constant voltage charge at 20° C. and 1 A up to an upper limit of 4.2 V, and then a constant current discharge of 500 mA was conducted until a final voltage of 2.5 V. A discharge capacity at this time was determined as a capacity before storage. After storage at 60° C. for one week, charge and discharge were conducted again several cycles under the same conditions, and a value of the highest capacity was regarded as a capacity after storage. Then, a discharge capacity retention ratio (%) was determined by the following equation.

Discharge capacity retention ratio (%)=(Capacity after storage/Capacity before storage)×100

(2) Cycle Characteristics at 60° C.

Under the same charge and discharge conditions as in the above item (1), charge and discharge were conducted for 100 cycles at 60° C. Assuming that a discharge capacity after 1 cycle is 100, the discharge capacity retention ratio (%) after 100 cycles was determined.

Evaluation results of storage characteristics at 60° C. and cycle characteristics at 60° C., and an angle between a proton adduct and a proton of Examples 1a to 9a and Comparative Examples 1a to 4a are shown in Table 1. A relation between the content of 4,5-bis(dimethylamino)fluorene and the discharge capacity retention ratio is shown in FIG. 2.

TABLE 1

| | | Compound to be added Content: 0.01% by weight | Discharge capacity retention ratio after storage at 60° C. (%) | Discharge capacity retention ratio after 100 cycles (%) | Angle between proton adduct and proton (°) |
|---|---|---|---|---|---|
| Examples | 1a | 4,5-bis(dimethylamino)fluorene | 88 | 80 | 178 |
| | 2a | 4,5-bis(dimethylamino)phenanthrene | 86 | 75 | 168 |
| | 3a | 1,9-bis(dimethylamino)dibenzothiophene | 88 | 79 | 175 |
| | 4a | 1,9-bis(dimethylamino)dibenzoselenophene | 86 | 76 | 175 |
| | 5a | 1,9-bis(dimethylamino)anthracene | 79 | 63 | 155 |
| Comparative Examples | 1a | None | 65 | 21 | — |
| | 2a | 1,8-bis(dimethylamino)naphthalene | 76 | 53 | 140 |

Figure 2:
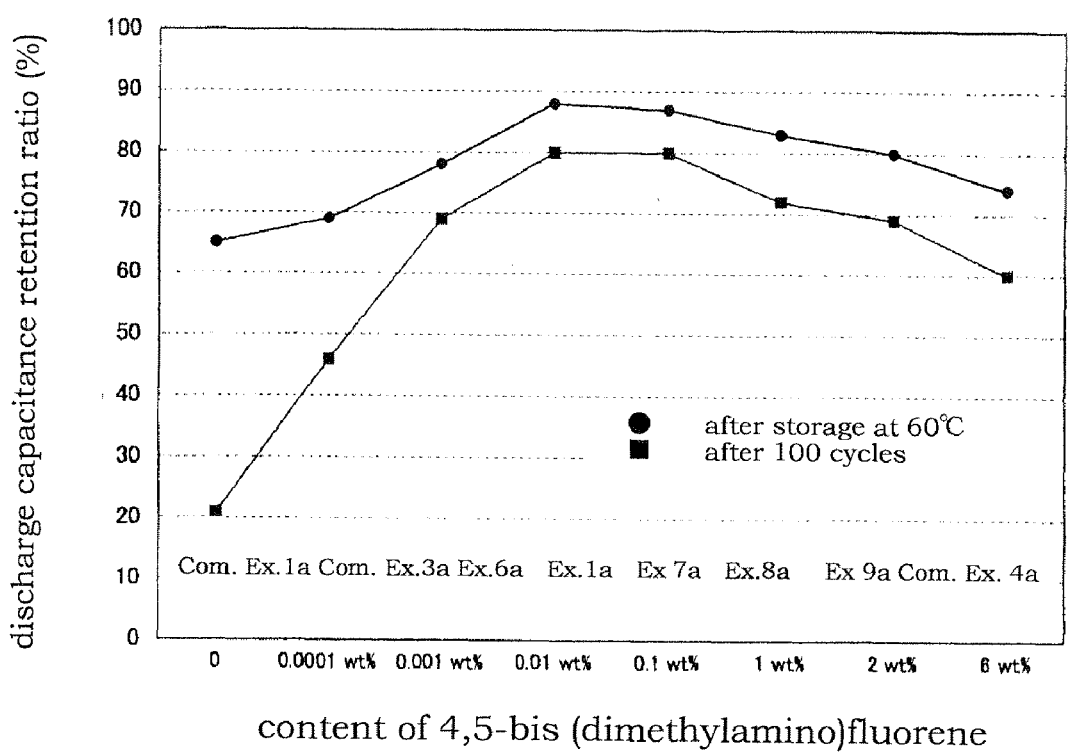
FIG. 2 is a graph showing a discharge capacitance retention ratio when a content of 4,5-bis(dimethylamino)fluorene is varied.

As is apparent form results shown in Table 1 and FIG. 2, in Examples 1a to 5a wherein a compound having a structure in which E is —$CH_2$—, —CH=CH—, —O—, —S— or —Se— in the chemical formula (1) and all the substituents $R_{1a}$ to $R_{4a}$ are methyl groups, or a compound having a structure in which all the substituents $R_{1a}$ to $R_{4a}$ are methyl groups in the chemical formula (2) was dissolved in a non-aqueous electrolytic solution, storage characteristics at 60° C. and cycle characteristics at 60° C. are improved, compared with Comparative Example 1a that does not contain these compounds.

Of these compounds, in Examples 1a, 6a, 7a, 8a and 9a wherein the content of 4,5-bis(dimethylamino)fluorene is adjusted within a range of 0.001% by weight or more and 2% by weight or less, particularly preferred results are obtained.

Example 1b

In a mixed solvent of 50% by volume of ethylene carbonate and 50% by volume of diethyl carbonate, $LiPF_6$ as an electrolyte salt was dissolved so as to adjust a concentration to 1.0 mol/l. Furthermore, 1,8-bis(dibutylamino)naphthalene in which all the substituents $R_{1b}$ to Rob are $C_4H_9$ and $R_5$ is H in the chemical formula (3) was dissolved in the above mixed solvent so as to adjust a concentration to 0.01% by weight to obtain a non-aqueous electrolytic solution.

Before injection of the non-aqueous electrolytic solution, a battery container has the following structure.

A positive electrode mixture was prepared by mixing 90 parts by weight of LiFePO$_4$ as an active material, 5 parts by weight of acetylene black as a conductive material and 5 parts by weight of polyvinylidene fluoride as a binder, and appropriately adding N-methyl-2-pyrrolidone, followed by dispersion. This positive electrode mixture was uniformly coated on a 20 μm thick aluminum current collector and dried, followed by compression using a roll press and further cutting into a desired size to produce a positive electrode plate.

A negative electrode mixture was prepared by mixing 90 parts by weight of natural graphite product in China and 10 parts by weight of polyvinylidene fluoride, appropriately adding N-methyl-2-pyrrolidone, followed by dispersion. This negative electrode mixture was uniformly coated on a 16 μm thick copper current collector and dried, followed by compression using a roll press and further cutting into a desired size to produce a negative electrode plate.

A 25 micron thick microporous polyethylene film was used as a separator.

The positive electrode plate was wrapped using the separator, and then alternatively laminated together with the negative electrode plate. A lead tab including aluminum and nickel was welded to the aluminum current collector of the positive electrode, while a lead tab including nickel was welded to the copper current collector of the negative electrode to produce a laminate including the positive electrode, the negative electrode and the separator.

After disposing so that the lead tab of the laminate protrudes out of a laminate film, an outer peripheral portion other than an electrolytic solution injecting hole of the laminate film was thermally fused so that the laminate is wrapped by the laminate film. Next, the non-aqueous electrolytic solution was injected into the battery container and the electrolytic solution injecting hole was sealed to produce a non-aqueous electrolyte battery.

Example 2b

A non-aqueous electrolyte battery was produced in the same manner as in Example 1b, except that 4,5-bis(dibutylamino)fluorene in which E is —CH$_2$— and all the substituents $R_{1b}$ to $R_{4b}$ are $C_4H_9$ in the chemical formula (4) was used in place of 1,8-bis (dibutylamino)naphthalene in the non-aqueous electrolytic solution.

Example 3b

A non-aqueous electrolyte battery was produced in the same manner as in Example 1b, except that a non-aqueous electrolytic solution containing 1,8-bis(dibutylamino)naphthalene in a content ratio of 0.005% by weight, and containing 4,5-bis(dibutylamino)fluorene in which E is —CH$_2$— and all the substituents $R_{1b}$ to $R_{4b}$ are $C_4H_9$ in the chemical formula (4) in a content ratio of 0.005% by weight was used.

Example 4b

A non-aqueous electrolyte battery was produced in the same manner as in Example 1b, except that a non-aqueous electrolytic solution containing 1,8-bis(dibutylamino)naphthalene in a content ratio of 0.005% by weight, and containing 1,8-bis(dibutylamino)-2,7-dimethoxynaphthalene in which all the substituents $R_{1b}$ to $R_{4b}$ are $C_4H_9$, and $R_5$ is OMe in the chemical formula (3) in a content ratio of 0.005% by weight was used.

Example 5b

A non-aqueous electrolyte battery was produced in the same manner as in Example 1b, except that a non-aqueous electrolytic solution containing 4,5-bis(dibutylamino) fluorene in which E is —CH$_2$— and all the substituents $R_{1b}$ to $R_{4b}$ are $C_4H_9$ in the chemical formula (4) in a content ratio of 0.005% by weight, and containing 1,9-bis(dibutylamino) dibenzothiophene in which E is —S— and all the substituents $R_{1b}$ to $R_{4b}$ are $C_4H_9$ in the chemical formula (4) in a content ratio of 0.005% by weight was used in place of 1,8-bis(dibutylamino)naphthalene.

Example 6b

A non-aqueous electrolyte battery was produced in the same manner as in Example 1b, except that 1,8-bis(dioctylamino)naphthalene in which all the substituents $R_{1b}$ to $R_{4b}$ are $C_8H_{17}$, and $R_5$ is H in the chemical formula (3) was used in place of 1,8-bis(dibutylamino)naphthalene in the non-aqueous electrolytic solution.

Example 7b

A non-aqueous electrolyte battery was produced in the same manner as in Example 1b, except that a content ratio of 1,8-bis (dibutylamino)naphthalene in the non-aqueous electrolytic solution was adjusted to 0.001% by weight.

Example 8b

A non-aqueous electrolyte battery was produced in the same manner as in Example 1b, except that the content ratio of 1,8-bis (dibutylamino)naphthalene in the non-aqueous electrolytic solution was adjusted to 0.1% by weight.

Example 9b

A non-aqueous electrolyte battery was produced in the same manner as in Example 1b, except that the content ratio of 1,8-bis (dibutylamino)naphthalene in the non-aqueous electrolytic solution was adjusted to 1% by weight.

Example 10b

A non-aqueous electrolyte battery was produced in the same manner as in Example 1b, except that the content ratio of 1,8-bis (dibutylamino)naphthalene in the non-aqueous electrolytic solution was adjusted to 2% by weight.

Comparative Example 1b

A non-aqueous electrolyte battery was produced in the same manner as in Example 1b, except that 1,8-bis (dibutylamino)naphthalene was not contained in the non-aqueous electrolytic solution.

Comparative Example 2b

A non-aqueous electrolyte battery was produced in the same manner as in Example 1a, except that triethylamine manufactured by Kishida Chemical Co., Ltd. was distilled and used in place of 1,8-bis (dibutylamino)naphthalene in the non-aqueous electrolytic solution.

Comparative Example 3b

A non-aqueous electrolyte battery was produced in the same manner as in Example 1b, except that the content ratio of 1,8-bis (dibutylamino)naphthalene in the non-aqueous electrolytic solution was adjusted to 0.0001% by weight.

Comparative Example 4b

A non-aqueous electrolyte battery was produced in the same manner as in Example 1b, except that the content ratio of 1,8-bis (dibutylamino)naphthalene in the non-aqueous electrolytic solution was adjusted to 6% by weight.
Evaluation of Characteristics With respect to Examples 1b to 10b and Comparative Examples 1b to 4b produced as described above, humidity-resistant storage characteristics were evaluated by the following procedures. The results are shown in Table 2

Each battery was subjected to a constant current/constant voltage charge at 20° C. and 1 A up to an upper limit of 4.2 V, and then a constant current discharge of 500 mA was conducted until a final voltage of 2.5 V. A discharge capacity at this time was determined as a capacity before storage. After storage in a thermohygrostat set at 40° C. and 85% RH for one month, charge and discharge were conducted again several cycles under the same conditions, and a value of the highest capacity was regarded as a capacity after storage. Then, a discharge capacity retention ratio (%) was determined by the following equation.

Discharge capacity retention ratio (%)=(Capacity after storage/Capacity before storage)×100 of 0.001% by weight or more and 5% by weight or less, compared with Comparative Examples 3b and 4b.

The non-aqueous electrolyte battery of the present invention includes the negative electrode containing the carbon material capable of doping and dedoping lithium ions as the negative electrode active material; the positive electrode containing the composite oxide of lithium and a transition metal as the positive electrode active material; and the non-aqueous electrolytic solution. The non-aqueous electrolytic solution to be used contains 0.001% by weight or more and 5% by weight or less of a diamine compound having two tertiary amino groups capable of interacting with the proton.

The above diamine compound having a specific structure has a property capable of strongly capturing protons. Therefore, protons derived from an acid such as hydrogen fluoride in the non-aqueous electrolytic solution can be captured, thus making it possible to suppress an adverse influence of an acid. Since it is possible to suppress the adverse influence of an acid, it becomes possible to improve stability without a change of a battery design and deterioration of charge-discharge characteristics. Particularly, since a larger amount of an acid is generated at high temperature, the non-aqueous electrolyte battery of the present invention has stability at high temperature. Therefore, according to the present invention, it is possible to provide the non-aqueous electrolyte battery having excellent cycle characteristics and storage sta-

TABLE 2

| | Compound to be added | Amount to be added (% by weight) | Discharge capacity retention ratio (%) |
|---|---|---|---|
| Example 1b | 1,8-bis(dibutylamino)naphthalene | 0.01 | 92.9 |
| Example 2b | 4,5-bis(dibutylamino)fluorene | 0.01 | 93.5 |
| Example 3b | 1,8-bis(dibutylamino)naphthalene | 0.005 | 95.3 |
| | 4,5-bis(dibutylamino)fluorene | 0.005 | |
| Example 4b | 1,8-bis(dibutylamino)naphthalene | 0.005 | 94.6 |
| | 1,8-bis(dibutylamino)-2,7-dimethoxynaphthalene | 0.005 | |
| Example 5b | 4,5-bis(dibutylamino)fluorene | 0.005 | 95.9 |
| | 1,9-bis(dibutylamino)dibenzothiophene | 0.005 | |
| Example 6b | 1,8-bis(dioctylamino)naphthalene | 0.01 | 90.8 |
| Example 7b | 1,8-bis(dibutylamino)naphthalene | 0.001 | 89.2 |
| Example 8b | 1,8-bis(dibutylamino)naphthalene | 0.1 | 95.2 |
| Example 9b | 1,8-bis(dibutylamino)naphthalene | 1 | 92.8 |
| Example 10b | 1,8-bis(dibutylamino)naphthalene | 2 | 93.1 |
| Comparative Example 1b | None | 0 | 72.5 |
| Comparative Example 2b | Triethylamine | 0.01 | 72.3 |
| Comparative Example 3b | 1,8-bis(dibutylamino)naphthalene | 0.0001 | 74.8 |
| Comparative Example 4b | 1,8-bis(dibutylamino)naphthalene | 6 | 82.5 |

As is apparent from Table 2, in Examples 1b to 10b wherein a compound represented by the chemical formula (3) or (4) in which a basic moiety is coated with a substituent is contained in a non-aqueous electrolytic solution, humidity-resistant storage characteristics are improved, compared with Comparative Example 1b that does not contain these compounds. In Examples 1b to 10b, humidity-resistant storage characteristics are improved, compared with Comparative Example 2b that contains a compound having a small steric hindrance. Therefore, in Examples 1b to 10b, even when moisture penetrates into a battery to be evaluated to generate an acid, it is possible to suppress an adverse influence of the acid.

In Examples 1b to 10b, humidity-resistant storage characteristics are improved by adjusting a content of the compound represented by the chemical formula (3) or (4) within a range bility at high temperature without a change of a battery design and deterioration of charge-discharge characteristics.

It is preferred to use, as the diamine compound, a diamine compound that is an aromatic compound having at least two benzene rings bonded via a bond or bonded directly, two amino groups being respectively present at a different substitutable position of the benzene rings, the substitutable position being a position where the two amino groups are closest with each other. Use of this diamine compound enables further suppression of the adverse influence of an acid. As a result, it is possible to provide the non-aqueous electrolyte battery having excellent cycle characteristics and storage stability.

It is preferred that the diamine compound is an aromatic compound in which a compound selected from phenanthrene, anthracene, naphthacene, acridine, fluorene, carbazole, dibenzofuran, dibenzothiophene and dibenzosenophene is substituted with two tertiary amino groups. Use of this diamine compound enables further suppression of the adverse influence of an acid. As a result, it is possible to provide the non-aqueous electrolyte battery having excellent cycle characteristics and storage stability.

It is preferred that the diamine compound has a structure represented by the chemical formula (A) or (B). Use of this diamine compound enables further suppression of the adverse influence of an acid. As a result, it is possible to provide the non-aqueous electrolyte battery having excellent cycle characteristics and storage stability.

Furthermore, it is preferred that the diamine compound has a structure in which an angle between two nitrogen atoms in the amino groups and a proton becomes 155 degrees or more and 180 degrees or less, when interacted with the proton. Use of this diamine compound makes it possible to provide the non-aqueous electrolyte battery having excellent cycle characteristics and storage stability at high temperature without a change of a battery design and deterioration of charge-discharge characteristics.

It is preferred that the diamine compound has a structure represented by the chemical formula (1) or (2). Use of this diamine compound enables further suppression of the adverse influence of an acid. As a result, it is possible to provide the non-aqueous electrolyte battery having excellent cycle characteristics and storage stability.

In the structure represented by the chemical formula (1) or (2), the angle between two nitrogen atoms in amine groups and a proton means an angle of an angle $N_1HN_2$ in a figure formed by connecting respective atoms so that two nitrogen atoms ($N_1$, $N_2$) in the amine groups and a hydrogen atom (H) are present on the same plane, and also means an angle θ in FIG. 1.

It is preferred that the diamine compound is a compound in which all substituents $R_{1a}$ to $R_{4a}$ are methyl groups. Use of this diamine compound enables further suppression of the adverse influence of an acid. As a result, it is possible to provide the non-aqueous electrolyte battery having excellent cycle characteristics and storage stability.

It is preferred that the diamine compound has a structure represented by the chemical formula (3) or (4).

The above diamine compound having a specific structure has a property capable of strongly capturing protons (property capable of strongly capturing an acid). Therefore, an acid such as hydrogen fluoride in the non-aqueous electrolytic solution can be captured. Since it is possible to suppress an adverse influence of an acid, it is possible to improve storage stability without a change of a battery design and deterioration of charge-discharge characteristics. Since a basic moiety reacting with an acid is coated with a substituent, a decomposition reaction of a basic substance on an electrode surface can be suppressed. Therefore, an influence of an acid can be suppressed over a long period. Therefore, according to the present invention, it is possible to provide the non-aqueous electrolyte battery having a function of suppressing the adverse influence of an acid over a long period.

Also, it is preferred that the non-aqueous electrolytic solution contains two or more kinds of the diamine compounds, and a total content of two or more kinds of the diamine compounds is in a range of 0.001% by weight or more and 5% by weight or less. Use of this non-aqueous electrolytic solution enables further suppression of the adverse influence of an acid. As a result, it is possible to provide the non-aqueous electrolyte battery having more excellent cycle characteristics and storage stability.

Furthermore, it is preferred that the non-aqueous electrolytic solution contains two or more kinds of the diamine compounds represented by the chemical formula (3), two or more kinds of the diamine compounds represented by the chemical formula (4), or contains one or more kinds of the diamine compounds represented by the chemical formula (3) and one or more kinds of the diamine compounds represented by the chemical formula (4), respectively. Use of this non-aqueous electrolytic solution enables further suppression of the adverse influence of an acid. In addition, use of diamine compounds each having a different capture rate enables further suppression of the adverse influence of an acid over a long period. As a result, it is possible to provide the non-aqueous electrolyte battery having more excellent cycle characteristics and storage stability.

Furthermore, it is preferred that the non-aqueous electrolytic solution contains at least one kind of a diamine compound represented by the chemical formulas (3) and (4) in which all substituents $R_{1b}$ to $R_{4b}$ are the same. Use of this non-aqueous electrolytic solution enables further suppression of the adverse influence of an acid. As a result, it is possible to provide the non-aqueous electrolyte battery having more excellent cycle characteristics and storage stability.

It is preferred that 0.001% by weight or more and 2% by weight or less of the diamine compound is contained in the non-aqueous electrolytic solution. Use of this diamine compound enables further suppression of the adverse influence of an acid. As a result, it is possible to provide the non-aqueous electrolyte battery having excellent cycle characteristics and storage stability.

It is preferred that the non-aqueous electrolytic solution contains $LiPF_6$. Use of this non-aqueous electrolytic solution enables realization of high conductivity while suppressing the adverse influence of an acid.

The invention thus described, it will be obvious that the same may be varied in many ways. Such variations are not to be regarded as a departure from the sprits and scope of the invention, and all such modifications as would be obvious to one skilled in the art are intended to be included within the scope of the following claims.

What is claimed is:

1. A non-aqueous electrolyte battery comprising
   a negative electrode containing a carbon material capable of doping and dedoping lithium ions as a negative electrode active material;
   a positive electrode containing a composite oxide of lithium and a transition metal as a positive electrode active material; and
   a non-aqueous electrolytic solution; wherein
   the non-aqueous electrolytic solution contains 0.001% by weight or more and 5% by weight or less of a diamine compound having two tertiary amino groups capable of interacting with a proton, wherein the diamine compound is an aromatic compound in which a compound selected from phenanthrene, anthracene, naphthacene, acridine, fluorene, carbazole, dibenzofuran, dibenzothiophene and dibenzoselenophene is substituted with two tertiary amino groups.

2. The non-aqueous electrolyte battery according to claim 1, wherein
   the two amino groups are respectively present at a different substitutable position of the benzene rings, and
   the substitutable position is a position where the two amino groups are closest with each other.

3. A non-aqueous electrolyte battery comprising
a negative electrode containing a carbon material capable of doping and dedoping lithium ions as a negative electrode active material;
a positive electrode containing a composite oxide of lithium and a transition metal as a positive electrode active material; and
a non-aqueous electrolytic solution; wherein
the non-aqueous electrolytic solution contains 0.001% by weight or more and 5% by weight or less of a diamine compound having two tertiary amino groups capable of interacting with a proton, wherein the diamine compound is a compound having a structure represented by a chemical formula (A):

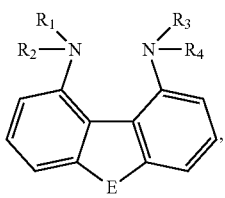

wherein E is any one of —$CH_2$—, —CH=CH—, —O—, —S— and —Se—; and substituents $R_1$ to $R_4$ are $C_nCH_{2n+1}$ (n =1 to 8), or a chemical formula (B):

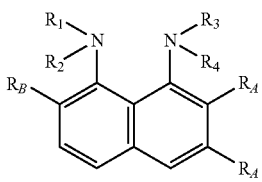

wherein a substituent $R_A$ is a hydrogen atom, a methoxy group, or a residue required to form a phenyl ring together with a carbon atom to which $R_A$ is attached; $R_B$ is a hydrogen atom or a methoxy group; and substituents $R_1$ to $R_4$ are $C_nH_{2n+1}$ (n=1 to 8), and n=1 to 3 when $R_A$ in the formula (B) is a residue required to form a phenyl ring, or n=4 to 8 when $R_A$ in the formula (B) is a hydrogen atom or a methoxy group.

4. The non-aqueous electrolyte battery according to claim 1, comprising a negative electrode containing a carbon material capable of doping and dedoping lithium ions as a negative electrode active material; a positive electrode containing a composite oxide of lithium and a transition metal as a positive electrode active material; and a non-aqueous electrolytic solution; wherein
the non-aqueous electrolytic solution contains 0.001% by weight or more and 5% by weight or less of a diamine compound having two tertiary amino groups capable of interacting with a proton, and
the diamine compound has a structure in which an angle between two nitrogen atoms in the amino groups and a proton becomes 155 degrees or more and 180 degrees or less, when interacted with the proton.

5. A non-aqueous electrolyte battery comprising
a negative electrode containing a carbon material capable of doping and dedoping lithium ions as a negative electrode active material;
a positive electrode containing a composite oxide of lithium and a transition metal as a positive electrode active material; and
a non-aqueous electrolytic solution; wherein
the non-aqueous electrolytic solution contains 0.001% by weight or more and 5% by weight or less of a diamine compound having two tertiary amino groups capable of interacting with a proton, wherein the diamine compound is a compound having a structure represented by a chemical formula (1):

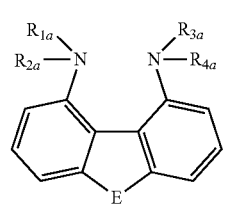

or a chemical formula (2):

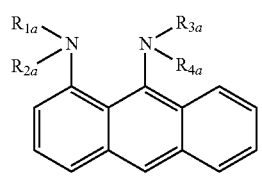

wherein E is any one of —$CH_2$—, —CH=CH—, —O—, —S— and —Se—; and substituents $R_{1a}$ to $R_{4a}$ are $C_nH_{2n+1}$ (provided that n=1 to 3).

6. The non-aqueous electrolyte battery according to claim 5, wherein the diamine compound is a compound in which all the substituents $R_{1a}$ to $R_{4a}$ are methyl groups.

7. A non-aqueous electrolyte battery comprising
a negative electrode containing a carbon material capable of doping and dedoping lithium ions as a negative electrode active material;
a positive electrode containing a composite oxide of lithium and a transition metal as a positive electrode active material; and
a non-aqueous electrolytic solution; wherein
the non-aqueous electrolytic solution contains 0.001% by weight or more and 5% by weight or less of a diamine compound having two tertiary amino groups capable of interacting with a proton, further comprising a negative electrode containing a carbon material capable of doping and dedoping lithium ions as a negative electrode active material; a positive electrode containing a composite oxide of lithium and a transition metal as a positive electrode active material; and a non-aqueous electrolytic solution; wherein
the non-aqueous electrolytic solution contains 0.001% by weight or more and 5% by weight or less of at least one kind of a diamine compound represented by a chemical formula (3)

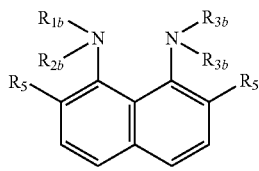
(3)

and a chemical formula (4):

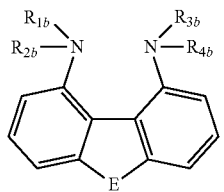
(4)

wherein E is any one of —$CH_2$—, —CH=CH—, —O—, —S— and —Se—; substituents $R_{1b}$ to $R_{4b}$ are linear alkyl groups having 4 to 8 carbon atoms (n=4 to 8) or branched alkyl groups having 3 to 8 carbon atoms (n=3 to 8) represented by $C_nH_{2n+1}$; and a substituent $R_5$ is a hydrogen atom or a methoxy group.

8. The non-aqueous electrolyte battery according to claim 7, wherein the non-aqueous electrolytic solution contains two or more kinds of the diamine compounds, and a total content of two or more kinds of the diamine compounds is in a range of 0.001% by weight or more and 5% by weight or less.

9. The non-aqueous electrolyte battery according to claim 7, wherein the non-aqueous electrolytic solution contains two or more kinds of the diamine compounds represented by the chemical formula (3), two or more kinds of the diamine compounds represented by the chemical formula (4), or contains one or more kinds of the diamine compounds represented by the chemical formula (3) and one or more kinds of the diamine compounds represented by the chemical formula (4), respectively.

10. The non-aqueous electrolyte battery according to claim 7, wherein the non-aqueous electrolytic solution contains at least one kind of a diamine compound represented by the chemical formulas (3) and (4) in which all substituents $R_{1b}$ to $R_{4b}$ are the same.

11. The non-aqueous electrolyte battery according to claim 1, wherein 0.001% by weight or more and 2% by weight or less of the diamine compound is contained in the non-aqueous electrolytic solution.

12. The non-aqueous electrolyte battery according to claim 1, wherein the non-aqueous electrolytic solution contains $LiPF_6$ as an electrolyte salt.

13. The non-aqueous electrolyte battery according to claim 1, wherein the proton is derived from moisture existing in the non-aqueous electrolyte battery.

\* \* \* \* \*